United States Patent
Agarwal et al.

(10) Patent No.: US 7,158,981 B2
(45) Date of Patent: *Jan. 2, 2007

(54) PROVIDING A CONSISTENT HIERARCHICAL ABSTRACTION OF RELATIONAL DATA

(75) Inventors: Nipun Agarwal, Santa Clara, CA (US); Eric Sedlar, San Francisco, CA (US); Ravi Murthy, Fremont, CA (US); Namit Jain, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/315,835

(22) Filed: Dec. 21, 2005

(65) Prior Publication Data

US 2006/0101041 A1    May 11, 2006

Related U.S. Application Data

(63) Continuation of application No. 10/260,384, filed on Sep. 27, 2002, now Pat. No. 7,051,033.

(60) Provisional application No. 60/378,800, filed on May 7, 2002, provisional application No. 60/326,052, filed on Sep. 28, 2001.

(51) Int. Cl.
*G06F 17/00* (2006.01)
*G06F 7/00* (2006.01)

(52) U.S. Cl. ............... 707/100; 707/200; 715/509; 715/514

(58) Field of Classification Search ............ 707/1–3, 707/8, 10; 715/853
See application file for complete search history.

(56) References Cited

U.S. PATENT DOCUMENTS 5,295,261 A    3/1994    Simonetti (Continued)

FOREIGN PATENT DOCUMENTS

EP    1 241 589 A2    9/2002

(Continued)

OTHER PUBLICATIONS

Banerjee, Sandeepan et al., "Oracle8i—The XML Enabled Data Management System"—Oracle Corporation, Mar. 2000, IEEE, pp. 561-568.

(Continued)

*Primary Examiner*—Alford W. Kindred
(74) *Attorney, Agent, or Firm*—Hickman Palermo Truong & Becker LLP

(57) ABSTRACT

A hierarchy may be explicitly or implicitly reflected in existing data maintained external to hierarchy structures. Such hierarchies are referred to herein as a "pre-existing hierarchies". Techniques are described herein for capturing a pre-existing hierarchy in hierarchy structures. After a pre-existing hierarchy has been captured, there exist two independent sets of data that reflect the hierarchy: the external hierarchy definition and the internal hierarchy definition. Changing either hierarchy definition changes the hierarchy. Therefore, to maintain a consistent reflection of the hierarchy, the internal hierarchy definition must be modified in response to changes made to the external hierarchy definition, and the external hierarchy definition must be modified in response to changes made to the internal hierarchy definition. Various techniques are described for maintaining consistency between the two hierarchy definitions.

20 Claims, 7 Drawing Sheets

U.S. PATENT DOCUMENTS

| | | |
|---|---|---|
| 5,404,513 A | 4/1995 | Powers et al. |
| 5,467,471 A | 11/1995 | Bader |
| 5,625,815 A | 4/1997 | Maier et al. |
| 5,680,614 A | 10/1997 | Bakuya et al. |
| 5,724,577 A | 3/1998 | Exley et al. |
| 5,734,887 A | 3/1998 | Kingberg et al. |
| 5,878,415 A | 3/1999 | Olds |
| 5,960,194 A | 9/1999 | Choy et al. |
| 5,964,407 A | 10/1999 | Sandkleiva |
| 5,974,407 A | 10/1999 | Sacks |
| 5,983,215 A | 11/1999 | Ross et al. |
| 5,987,506 A | 11/1999 | Carter et al. |
| 5,999,941 A | 12/1999 | Andersen |
| 6,003,040 A | 12/1999 | Mital et al. |
| 6,012,067 A | 1/2000 | Sarkar |
| 6,038,563 A | 3/2000 | Bapat et al. |
| 6,055,544 A | 4/2000 | DeRose et al. |
| 6,061,684 A | 5/2000 | Glasser et al. |
| 6,128,610 A | 10/2000 | Srinivasan et al. |
| 6,141,655 A | 10/2000 | Johnson et al. |
| 6,154,741 A | 11/2000 | Feldman |
| 6,189,012 B1 | 2/2001 | Mital et al. |
| 6,199,195 B1 | 3/2001 | Goodwin et al. |
| 6,208,993 B1 | 3/2001 | Shadmone |
| 6,236,988 B1 | 5/2001 | Aldred |
| 6,240,407 B1 | 5/2001 | Chang et al. |
| 6,263,332 B1 | 7/2001 | Nasr et al. |
| 6,269,380 B1 | 7/2001 | Terry et al. |
| 6,279,006 B1 | 8/2001 | Shigemi et al. |
| 6,279,007 B1 | 8/2001 | Uppala |
| 6,298,349 B1 | 10/2001 | Toyoshima et al. |
| 6,341,289 B1 | 1/2002 | Burroughs et al. |
| 6,343,287 B1 | 1/2002 | Kumar et al. |
| 6,356,920 B1 | 3/2002 | Vandersluis |
| 6,366,934 B1 | 4/2002 | Cheng et al. |
| 6,370,537 B1 | 4/2002 | Gilbert et al. |
| 6,418,448 B1 | 7/2002 | Sarkar |
| 6,438,540 B1 | 8/2002 | Nasr et al. |
| 6,438,562 B1 | 8/2002 | Gupta et al. |
| 6,449,620 B1 | 9/2002 | Draper et al. |
| 6,470,344 B1 | 10/2002 | Kothuri et al. |
| 6,487,546 B1 | 11/2002 | Witkowski |
| 6,496,842 B1 | 12/2002 | Lyness |
| 6,510,434 B1 | 1/2003 | Anderson et al. |
| 6,571,231 B1 | 5/2003 | Sedlar |
| 6,574,655 B1 | 6/2003 | Libert et al. |
| 6,584,459 B1 | 6/2003 | Chang et al. |
| 6,604,100 B1 | 8/2003 | Fernandez et al. |
| 6,636,845 B1 | 10/2003 | Chau et al. |
| 6,643,633 B1 | 11/2003 | Chau et al. |
| 6,675,230 B1 | 1/2004 | Lewallen |
| 6,704,739 B1 | 3/2004 | Craft et al. |
| 6,704,747 B1 | 3/2004 | Fong |
| 6,708,186 B1 | 3/2004 | Claborn et al. |
| 6,718,322 B1 | 4/2004 | Brye |
| 6,721,727 B1 | 4/2004 | Chau et al. |
| 6,725,212 B1 | 4/2004 | Couch et al. |
| 6,732,222 B1 | 5/2004 | Garritsen et al. |
| 6,754,661 B1 | 6/2004 | Hallin et al. |
| 6,772,350 B1 | 8/2004 | Belani et al. |
| 6,778,977 B1 | 8/2004 | Avadhanam et al. |
| 6,785,673 B1 | 8/2004 | Fernandez et al. |
| 6,795,821 B1 | 9/2004 | Yu |
| 6,826,568 B1 | 11/2004 | Bernstein et al. |
| 6,826,727 B1 | 11/2004 | Mohr et al. |
| 6,826,857 B1 | 12/2004 | Bachmann |
| 6,836,778 B1 | 12/2004 | Manikutty et al. |
| 6,871,204 B1 | 3/2005 | Krishnaprasad et al. |
| 6,918,082 B1 | 7/2005 | Gross et al. |
| 6,964,025 B1 | 11/2005 | Angiulo et al. |
| 2001/0037345 A1 | 11/2001 | Kiernan et al. |
| 2002/0015042 A1 | 2/2002 | Robotham et al. |
| 2002/0035606 A1 | 3/2002 | Kenton |
| 2002/0038358 A1 | 3/2002 | Sweatt, III et al. |
| 2002/0056025 A1 | 5/2002 | Qui et al. |
| 2002/0087510 A1* | 7/2002 | Weinberg et al. ............... 707/1 |
| 2002/0116371 A1 | 8/2002 | Dodds et al. |
| 2002/0120685 A1 | 8/2002 | Srivastava et al. |
| 2002/0123993 A1 | 9/2002 | Chau et al. |
| 2002/0124100 A1 | 9/2002 | Adams |
| 2002/0133484 A1 | 9/2002 | Chau et al. |
| 2002/0143512 A1 | 10/2002 | Shamoto et al. |
| 2002/0156772 A1 | 10/2002 | Chau et al. |
| 2002/0156811 A1 | 10/2002 | Krupta |
| 2002/0169788 A1 | 11/2002 | Lee et al. |
| 2002/0184188 A1 | 12/2002 | Mandyam et al. |
| 2002/0184401 A1 | 12/2002 | Kadel, Jr. et al. |
| 2002/0194157 A1 | 12/2002 | Zait et al. |
| 2002/0198874 A1 | 12/2002 | Nasr et al. |
| 2003/0004937 A1 | 1/2003 | Salmenkaita et al. |
| 2003/0009361 A1 | 1/2003 | Hancock et al. |
| 2003/0014397 A1 | 1/2003 | Chau et al. |
| 2003/0033285 A1* | 2/2003 | Jalali et al. .................... 707/1 |
| 2003/0065659 A1 | 4/2003 | Agarwal et al. |
| 2003/0093672 A1 | 5/2003 | Cichowlas |
| 2003/0101194 A1 | 5/2003 | Rys et al. |
| 2003/0140308 A1 | 7/2003 | Murthy et al. |
| 2003/0154204 A1* | 8/2003 | Chen-Wright et al. ...... 707/100 |
| 2003/0158897 A1 | 8/2003 | Ben-Natan et al. |
| 2003/0172135 A1 | 9/2003 | Bobick et al. |
| 2003/0182624 A1 | 9/2003 | Large |
| 2003/0212662 A1 | 11/2003 | Shin et al. |
| 2004/0043758 A1 | 3/2004 | Sorvari et al. |
| 2004/0064466 A1 | 4/2004 | Manikutty et al. |
| 2004/0088415 A1 | 5/2004 | Chandrasekar et al. |
| 2004/0176958 A1 | 9/2004 | Salmenkaita et al. |
| 2004/0220912 A1 | 11/2004 | Manikutty et al. |
| 2004/0220927 A1 | 11/2004 | Murthy et al. |
| 2004/0225680 A1 | 11/2004 | Cameron et al. |
| 2004/0230667 A1 | 11/2004 | Wookey |
| 2005/0010896 A1 | 1/2005 | Meliksetian et al. |
| 2005/0050058 A1 | 3/2005 | Jain et al. |
| 2005/0050092 A1 | 3/2005 | Jain et al. |
| 2005/0050105 A1 | 3/2005 | Idicula et al. |
| 2005/0138047 A1 | 6/2005 | Liu et al. |
| 2005/0228786 A1 | 10/2005 | Murthy et al. |
| 2005/0229158 A1 | 10/2005 | Thusoo et al. |
| 2005/0289125 A1 | 12/2005 | Liu et al. |
| 2006/0031204 A1 | 2/2006 | Liu et al. |
| 2006/0031233 A1 | 2/2006 | Liu et al. |

FOREIGN PATENT DOCUMENTS

| | | |
|---|---|---|
| WO | WO 00/49533 | 8/2000 |
| WO | WO 01/42881 A2 | 6/2001 |
| WO | WO 01/59602 A1 | 8/2001 |
| WO | WO 01/61566 A1 | 8/2001 |

OTHER PUBLICATIONS

Bohannon, Philip et al., "From XML Schema to Relations: A Cost-Based Approach to XML Storage"—Bell Laboratories, IEEE—2002—Proceedings of the 18th International Conference on Data Engineering (ICDE '02), pp. 1-28.

Bourret, R., et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

Braga, Daniele et al., "A Graphical Environment to Query XML Data with Query," Proceedings of the Fourth International Conference on Web Information Systems Engineering (WISE '03), 2003, IEEE, 10 pages.

Chae, Mi-Ok et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Chen, Ruey-Shun et al., "Developing an XML framework for metadata system", Trinity College Dublin, Proc. of the 1st Inter. Sympo. on Information and Communication, pp. 267-272.

Cheng, Josephine, et al., "IBM DB2 XML Extender, An end-to-end solution for storing and retrieving XML documents." IEEE, 2000, ICDE '00 Conference, San Diego, Feb. 2000, 128 pages.

Choi, Byron et al., "The XQuey Formal Semantics: A Foundation for Implementation Optimization," May 31, 2002, IEEE XP-002353605, 15 pages.

Dayen, I., "Storing XML in Relational Databases", XML.com XP-002275971(1998-2004) pp. 1-13.

Florescu, Daniela et al., "A Performance Evaluation of Alternative Mapping Schemes for Storing XML Data in a Relational Database," May 1999, XP-002168318, pp. 1-31.

Funderbunk, J. et al., "XML programming with SQL/XML and XQuery", *IBM Systems Journal* XP-002295973 (2002) pp. 642-665. Hierarchical Queries, XP-002295972, pp. 8-3 to 8-7.

Higgins, Shelley, , "Oracle9i, XML Database Developer's Guide—Oracle XML DB," Release 2 (9.2), Oracle Corporation, Oct. 2002, Part No. A96620-02, pp. 1-1,044.

Jajodia, Sushil, et al., "Toward a Multilevel Secure Relational Data Model," ACM, 1991, 8393 SIGMOD Record, Jun. 20, 1991, No. 2, New York, US, XP 000364619, pp. 50-59.

Kang, Ji-Hoon et al., "An XQuery Engine for Digital Library Systems that support XML data," Proceedings of the 2004 International Symposium on Application and the Internet Workshops, IEEE XP-0010684128, 5 pages.

Katz, Howard et al., "Integrating XQuery and Relational Database Systems," Chapter 7—*XQuery from the Experts: A Guide to the W3C XML Query Language*, Addison Wesley Professional, Aug. 22, 2003, ISBM 978-0-321-18060-5, pp. 353-391.

Khan, Latifur, et al. "A Performance Evaluation of Storing XML Data in Relational Database Management Systems", ACM-2001 (pp. 31-38).

Lawrence et al. "Integrating Relational Database Schemas Using a Standardized Dictionary"—2001—ACM (pp. 225-230).

Lo et al., "XAS: A System for Accessing Componentized, Virtual XML Documents," IEEE, 2001, pp. 493-502.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

McHugh, Jason et al., "Query Optimization for XML", XP-002333353, *Proceedings of the 25th VLDB Conference* (1999) pp. 315-326.

Melton, Jim, "ISO-ANSI Working Draft, XML-Related Specifications (SQL/XML)," WG3: DRS-020, H2-2002-365, Aug. 2002, 154 pages.

Murthy, Ravi et al., "XML Schemas in Oracle XML DB," Proceedings of the 29th VLDB Conference, 2003, IEEE XP-002353604, pp. 1009-1018.

Myllymaki, Jussi, "Effective Web Data Extraction with Standard XML Technologies," WWW10, May 1-5, 2001, pp. 689-696.

Noser, Hansrudi et al., Dynamic 3D Visualization of Database-Defined Tree Structures on the WWW by Using Rewriting Systems, 2000, IEEE, XP-002262516, pp. 247-254.

ORACLE technology network "Code Listing 3: Use XMLAgg to aggregate XML elements," Oracle, 2005, located at http://www.oracle.com/technology/oramag/oracle/03-may/033xml_13.html, 2 pages.

Ramakrishnan, Ragu et al., "SRQL: Sorted Relational Query Language," Jul. 3, 1998, IEEE, pp. 84-95.

Schmidt et al.—"Efficient Relational Storage and Retrieval of XML Documents"—CWI, The Netherlands (pp. 1-6).

Schmidt et al., "Why and How to Benchmark XML Databases," SIGMOND Record, vol. 3, No. 3, Sep. 2001, pp. 27-32.

Shanmugasundaram, Jayavel, et al., "Querying XML Views of Relational Data," Proceedings of the 27th Very Large Databases Conference, Rome, Italy, Sep. 2001, pp. 261-270.

Vion-Dury, Jean-Yves, "XPath on left and right sides of rules: toward compact XML tree rewriting through node patterns", 2003, ACM Press, pp. 19-25.

Vorthmann, S. et al. "Beyond Schemas, Schema Adjuncts and the Outside World," Markup Languages, Online!, vol. 2, No. 3, Jun. 2000, pages.

W3C, "XML Path Language (XPath) 2.0," W3C Recommendation, Working Draft, Oct. 29, 2004, retrieved from the internet:<http://www.w3.org/TR/2004/WD-xpath20-20041029>, retrieved on Apr. 14, 2005, pp. 1-111.

W3C, "XML Schema Part 1: Structures," W3C Recommendation, May 2, 2001, http://www.w3.org/TR/2001/REC-xmlschema-1-20010502/, pp. 1-203.

W3C, "XML Schema Part 2: Datatypes," W3C Recommendation, May 2, 2001, http://www.w3.org/TR/2001/REC-xmlschema-2-20010502/, pp. 1-146.

W3C, "XML Syntax for XQuery 1.0 (XQueryX)," W3C Recommendation, Working Draft, Dec. 19, 2003, retrieved from the internet:<http://www.w3.org/TR/2003/WD-xquery-20031219>, retrieved on Apr. 14, 2005, pp. 1-55.

W3C, "XML Path Language (XPath) 2.0," W3C Recommendation, Working Draft, Oct. 29, 2004, retrieved from the internet:<http://www.w3.org/TR/2004/WD-xpath20-20041029>, retrieved on Apr. 14, 2005, pp. 1-111.

W3C, "XQuery 1.0: An XML Query Language," W3C Recommendation, Working Draft, Oct. 29, 2004, retrieved from the internet:<http://www.w3.org/TR/2004/WD-xquery-20041029>, retrieved on Apr. 14, 2005, pp. 1-189.

Yoshikawa, Masatoshi et al., "XRel: A Path-Based Approach to Storage and Retrieval of XML Documents Using Relational Databases", XP-001143686, *ACM Transactions on Internet Technology* (2001), pp. 110-141.

Zemke, Fred, "XMLQuery," Change Proposal, ISO/IEC JTC1/SC32 WG3:SIA-nnn ANSI NCITS H2-2004-02lrl, Mar. 14, 2004, 29 pages.

Zhang, Hui et al., "XQuery rewriting at the relational algebra level," Computer Systems Science and Engineering, vol. 18, No. 5, Sep. 2003, IEEE XP-009056809, pp. 241-262.

Zhang, Xin et al., "Honey, I Shrunk the XQuery!—An XML Algebra Optimization Approach," Submission for WIDM'02, IEEE XP-002316448, 14 pages.

Zisman et al., "Using XML to Build Consistency Rules for Distributed Specifications," Proceedings of the Tenth International Workshop on Software Specification and Design (IWSD'00), IEEE 2000, 8 pages.

International Preliminary Examining Authority, "Written Opinion", PCT/US02/30783, dated Feb. 17, 2004, 8 pages.

International Preliminary Examination Report, Application No. PCT/US02/30783, pp. 1-14.

Current claims in PCT/US02/30783, pp. 1-8.

Notification of Transmittal of the International Search Report and the Written Opinion of the International Searching Authority, or the Declaration received from International application No. PCT/US2005/011762.

Pending claims from International application No. PCT/US2005/011762.

International Searching Authority, "Notification of Transmittal of the International Search Report and the Written Opinion of the International Authority, or the Declaration," Nov. 4, 2004, PCT/US2004/010018, 14 pages.

PCT/US2004/010018—current claims.

International Searching Authority, "Notification of Transmittal of the International Search Report and the Written Opinion of the International Searching Authority, or the Declaration," PCT/US2005/021259, dated Nov. 24, 2005, 13 pages.

Current Claims, PCT/US2005/021259, 15 pages.

International Preliminary Examination Report, Application No. PCT/US03/35551, Oct. 8, 2004, pp. 1-17.

Written Opinion, Application No. PCT/US03/35551, Nov. 10, 1004, 6 pages.

Current claims in PCT/US03/35551, pp. 1-4.

State Intelluctual Property Office of P.R.C., "Notification of the Fist Office Action," App. No. 02819169.2, dated Apr. 28, 2006, 4 pages + 5 page translation.

* cited by examiner

FIG. 3

| NODE | NAME | DATA |
|---|---|---|
| 1 | a | D1 |
| 2 | b | D2 |
| 3 | c | D3 |
| 4 | d | D4 |
| 5 | e | D5 |
| 6 | f | D6 |
| 7 | a | D7 |

| PARENT | CHILD |
|---|---|
| <ROOT> | 1 |
| 1 | 2 |
| 1 | 3 |
| 2 | 4 |
| 2 | 5 |
| 3 | 6 |
| 3 | 7 |

| MANUFACTURER | PRODUCT_TYPE | PRODUCT_NAME | SKU |
|---|---|---|---|
| MF1 | PD1 | PN1 | SKU1 |
| MF1 | PD1 | PN2 | SKU2 |
| MF1 | PD2 | PN3 | SKU3 |
| MF2 | PD3 | PN4 | SKU4 |
| MF2 | PD3 | PN4 | SKU5 |
| . . . | . . . | . . . | . . . |

FIG. 5

PROVIDING A CONSISTENT HIERARCHICAL ABSTRACTION OF RELATIONAL DATA

RELATED APPLICATIONS

The present application is a continuation of U.S. patent application Ser. No. 10/260,384, filed on Sep. 27, 2002 now U.S. Pat. No. 7,051,033, entitled PROVIDING A CONSISTENT HIERARCHICAL ABSTRACTION OF RELATIONAL DATA, by Nipun Agarwal, Eric Sedlar, Ravi Murthy and Namit Jain, which claims priority to the each of the following provisional applications (1) U.S. Provisional Patent Application No. 60/326,052, filed on Sep. 28, 2001, entitled "File Based Access Provided With a Database System," by Eric Sedlar and Viswanathan Krishnamurthy, and (2) U.S. Provisional Patent Application No. 60/378,800, filed on May 7, 2002, entitled "SQL Access to Data that Provides a File System Abstraction," by Nipun Agarwal, Ravi Murthy, Eric Sedlar, Sivasankaran Chandrasekar, Fei Ge, Syam Pannala, Neema Jalali and Muralidhar Krishnaprasad. The present application claims priority to all the previously filed provisional and non-provision applications identified in this paragraph. The present application incorporates by reference all the previously filed provisional and non-provision applications identified in this paragraph.

The present application is also related to the following U.S. Patent Applications, the entire contents of which are incorporated herein by reference:

U.S. patent application Ser. No. 10/260,138, filed on the Sep. 27, 2002, entitled OPERATORS FOR ACCESSING HIERARCHICAL DATA IN A RELATIONAL SYSTEM, by Nipun Agarwal, Ravi Murthy, Eric Sedlar, Sivasankaran Chandrasekar and Fei Ge;

U.S. patent application Ser. No. 10/259,278, filed on the Sep. 27, 2002, entitled MECHANISM FOR MAPPING XML SCHEMAS TO OBJECT-RELATIONAL DATABASE SYSTEMS, by Ravi Murthy, Muralidhar Krishnaprasad, Sivasankaran Chandrasekar, Eric Sedlar, Vishu Krishnamurthy and Nipun Agarwal;

U.S. patent application Ser. No. 10/260,161, filed on the Sep. 27, 2002, entitled INDEXING TO EFFICIENTLY MANAGE VERSIONED DATA IN A DATABASE SYSTEM, by Nipun Agarwal, Eric Sedlar and Ravi Murthy;

U.S. patent application Ser. No. 10/256,524, filed on the Sep. 27, 2002, entitled MECHANISMS FOR STORING CONTENT AND PROPERTIES OF HIERARCHICALLY ORGANIZED RESOURCES, by Ravi Murthy, Eric Sedlar, Nipun Agarwal, and Neema Jalali;

U.S. patent application Ser. No. 10/259,176, filed on the Sep. 27, 2002, entitled MECHANISM FOR UNIFORM ACCESS CONTROL IN A DATABASE SYSTEM, by Ravi Murthy, Eric Sedlar, Nipun Agarwal, Sam Idicula, and Nicolas Montoya;

U.S. patent application Ser. No. 10/256,777, filed on the Sep. 27, 2002, entitled LOADABLE UNITS FOR LAZY MANIFESTATION OF XML DOCUMENTS by Syam Pannala, Eric Sedlar, Bhushan Khaladkar, Ravi Murthy, Sivasankaran Chandrasekar, and Nipun Agarwal;

U.S. patent application Ser. No. 10/260,381, filed on the Sep. 27, 2002, entitled MECHANISM TO EFFICIENTLY INDEX STRUCTURED DATA THAT PROVIDES HIERARCHICAL ACCESS IN A RELATIONAL DATABASE SYSTEM, by Neema Jalali, Eric Sedlar, Nipun Agarwal, and Ravi Murthy.

FIELD OF THE INVENTION

The present invention relates to storing, in a relational database, information that is organized according to a hierarchy and, more specifically, to techniques for managing the metadata that captures the hierarchy.

BACKGROUND OF THE INVENTION

Humans tend to organize information in categories. The categories in which information is organized are themselves typically organized relative to each other in some form of hierarchy. For example, an individual animal belongs to a species, the species belongs to a genus, the genus belongs to a family, the family belongs to an order, and the order belongs to a class.

With the advent of computer systems, techniques for storing electronic information have been developed that largely reflected this human desire for hierarchical organization. Conventional computer file systems, for example, are typically implemented using hierarchy-based organization principles. Specifically, a typical file system has directories arranged in a hierarchy, and documents stored in the directories. Ideally, the hierarchical relationships between the directories reflect some intuitive relationship between the meanings that have been assigned to the directories. Similarly, it is ideal for each document to be stored in a directory based on some intuitive relationship between the contents of the document and the meaning assigned to the directory in which the document is stored.

FIG. 1 shows an example of a typical file system. The illustrated file system includes numerous directories arranged in a hierarchy. Two documents 118 and 122 are stored in the directories. Specifically, documents 118 and 122, both of which are entitled "Example.doc", are respectively stored in directories 116 and 124, which are respectively entitled "Word" and "App4".

In the directory hierarchy, directory 116 is a child of directory 114 entitled "Windows", and directory 114 is a child of directory 110. Similarly, directory 124 is a child of directory 126 entitled "VMS", and directory 126 is a child of directory 110. Directory 110 is referred to as the "root" directory because it is the directory from which all other directories descend. In many systems, the symbol "/" is used to refer to the root directory.

When electronic information is organized in a hierarchy, each item of information may be located by following a "path" through the hierarchy to the entity that contains the item. Within a hierarchical file system, the path to an item begins at the root directory and proceeds down the hierarchy of directories to eventually arrive at the directory that contains the item of interest. For example, the path to file 118 consists of directories 110, 114 and 116, in that order.

Hierarchical storage systems often allow different items to have the same name. For example, in the file system shown in FIG. 1, both of the documents 118 and 122 are entitled "Example.doc". Consequently, to unambiguously identify a given document, more than just the name of the document is required.

A convenient way to identify and locate a specific item of information stored in a hierarchical storage system is through the use of a "pathname". A pathname is a concise way of uniquely identifying an item based on the path through the hierarchy to the item. A pathname is composed of a sequence of names. In the context of a file system, each name in the sequence of names is a "filename". The term "filename" refers to both the names of directories and the names of documents, since both directories and documents are considered to be "files".

Within a file system, the sequence of filenames in a given pathname begins with the name of the root directory, includes the names of all directories along the path from the root directory to the item of interest, and terminates in the name of the item of interest. Typically, the list of directories to traverse is concatenated together, with some kind of separator punctuation (e.g., '/', '\', or ';') to make a pathname. Thus, the pathname for document 118 is /Windows/ Word/Example.doc, while the pathname for document 122 is /NVMS/App4/Example.doc.

The relationship between directories (files) and their contained content varies significantly between different types of hierarchically organized systems. One model, employed by various implementations, such as Windows and DOS file systems, requires each file to have exactly one parent, forming a tree. In a more complicated model, the hierarchy takes the form of a directed graph, where files can have multiple parents, as in the UNIX file system in which hard links are used.

In contrast to hierarchical approaches to organizing electronic information, a relational database stores information in tables comprised of rows and columns. Each row is identified by a unique RowID. Each column represents an attribute of a record, and each row represents a particular record. Data is retrieved from the database by submitting queries to a database management system (DBMS) that manages the database. The queries must conform to the database language supported by the database management system. Structured Query Language (SQL) is an example of a database language supported by many existing database management systems.

Each type of storage system has advantages and limitations. A hierarchically organized storage system is simple, intuitive, and easy to implement, and is a standard model used by most application programs. Unfortunately, the simplicity of the hierarchical organization does not provide the support required for complex data retrieval operations. For example, the contents of every directory may have to be inspected to retrieve all documents created on a particular day that have a particular filename. Since all directories must be searched, the hierarchical organization does nothing to facilitate the retrieval process.

A relational database system is well suited for storing large amounts of information and for accessing data in a very flexible manner. Relative to hierarchically organized systems, data that matches even complex search criteria may be easily and efficiently retrieved from a relational database system. However, the process of formulating and submitting queries to a database server is less intuitive than merely traversing a hierarchy of directories, and is beyond the technical comfort level of many computer users.

In the past, hierarchically organized systems and relationally organized systems have been implemented in different ways that were not compatible. With some additional processing, however, a relationally organized system can emulate a hierarchically organized system. This type of emulation is especially desirable when the storage capability and flexibility of a relational system is needed, but the intuitiveness and ubiquity of the hierarchical system is desired.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a block diagram of relational tables that can be used to capture the hierarchy illustrated in FIG. 2, according to an embodiment of the invention;

FIG. 5 is a block diagram of a relational table in which non-leaf nodes of an information hierarchy are indicated by values stored in rows that correspond to the leaf nodes;

DETAILED DESCRIPTION OF EMBODIMENTS OF THE INVENTION

Figure 1:
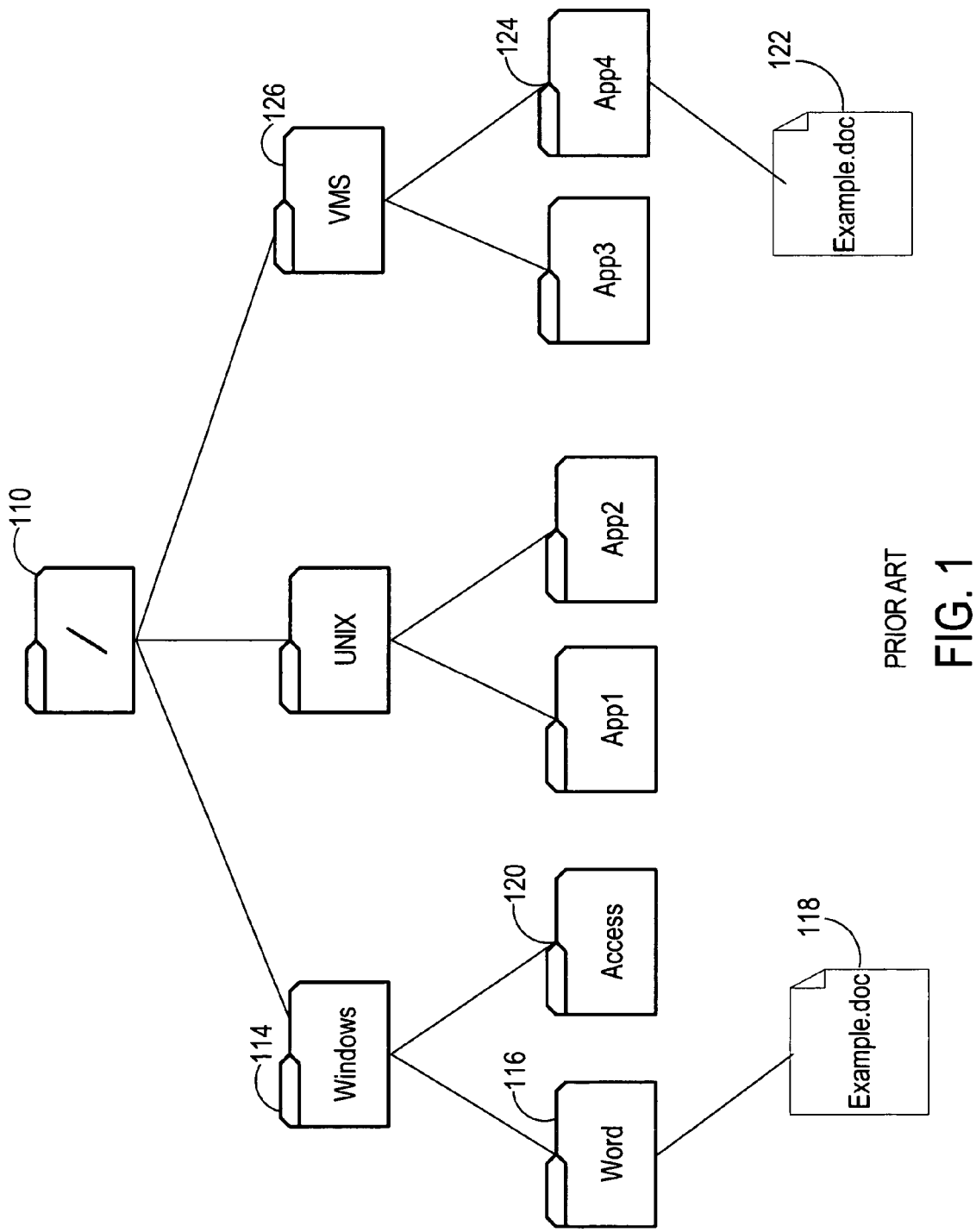
FIG. 1 is a block diagram showing a hierarchical file system.

A method and system are described for storing resources that belong to an information hierarchy into structures within a relational database system. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Various techniques are provided for facilitating the management of hierarchical data within a relational database system. According to one embodiment, the storage structures used to store the content of the resources that belong to a hierarchy (the "content structures") are separate from the storage structures used to store data that captures the information about the hierarchy (the "hierarchy structures").

In some situations, a hierarchy may already be explicitly or implicitly reflected in existing data maintained external to the hierarchy structures. Such hierarchies are referred to herein as a "pre-existing hierarchies". In these situations, it is desirable to capture the pre-existing hierarchy in the hierarchy structures so that the hierarchy structures may be used as an alternative access path to the resources. For example, the hierarchy structures may be used to access the resources based on path information. Further, even when the resources are accessed by issuing queries directly against the content structures, the access operations gain the benefits of any features and access structures associated with the hierarchy structures, such as any security mechanism built into the hierarchy structures and any indexes built to increase the performance of operations that access resources based on their position within the hierarchy.

Each pre-existing hierarchy is associated with data that (1) resides external to the hierarchy structures, and (2) reflects the pre-existing hierarchy. Such data is referred to herein as an "external hierarchy definition". To capture a pre-existing hierarchy in the hierarchy structures, data (referred to herein as the "internal hierarchy definition") must be added to the hierarchy structure based on the external hierarchy definition.

After a pre-existing hierarchy has been captured, there exist two independent sets of data that reflect the hierarchy: the external hierarchy definition and the internal hierarchy definition. Changing either hierarchy definition changes the hierarchy. Therefore, to maintain a consistent reflection of the hierarchy, the internal hierarchy definition must be modified in response to changes made to the external hierarchy definition, and the external hierarchy definition must be modified in response to changes made to the internal hierarchy definition. Various techniques are described herein for maintaining consistency between the two hierarchy definitions.

Storing Hierarchical Data in a Database System

Figure 2:
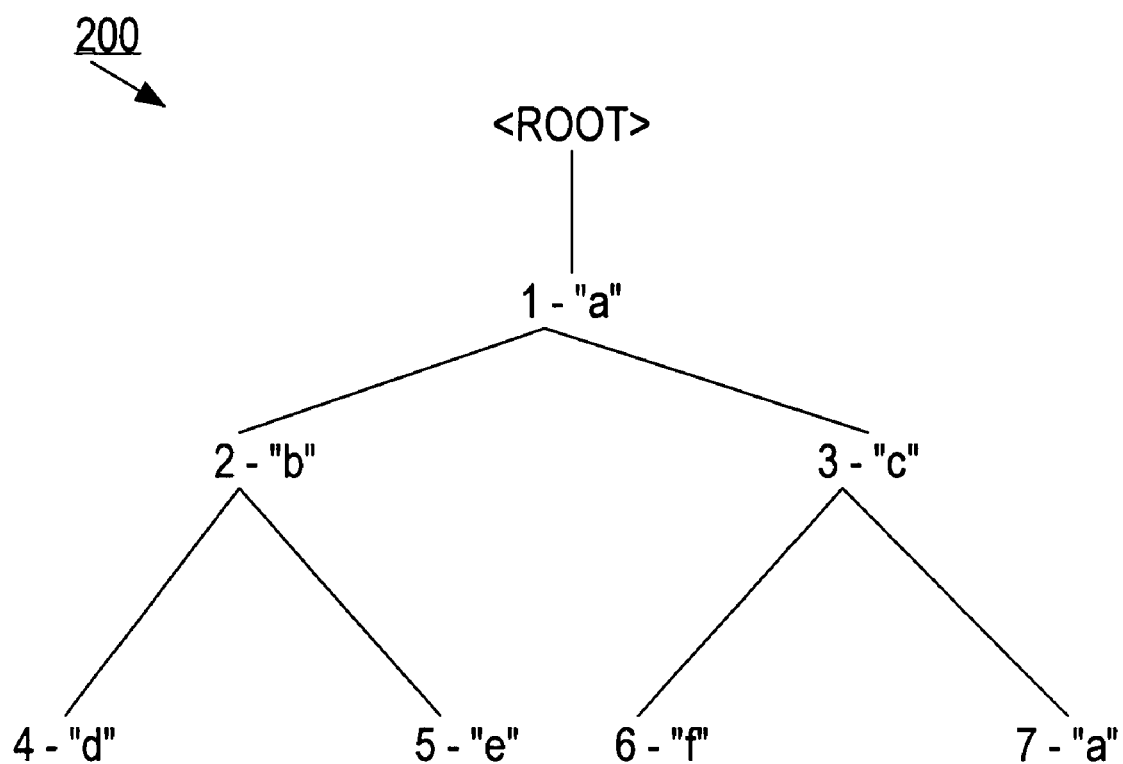
FIG. 2 is a block diagram showing a hierarchy of nodes that are associated with resources.

FIG. 2 is a block diagram that illustrates a hierarchy 200 that is used in examples that are provided herein to facilitate an understanding of embodiments of the invention. Hierarchy 200 includes eight nodes. The highest node in the hierarchy is referred to as the "root" node. The nodes at the end of each branch in the hierarchy are "leaf" nodes. The nodes between the root node and the leaf nodes are "intermediate" nodes. In the illustrated hierarchy, nodes 1, 2, and 3 are intermediate nodes, and nodes 4, 5, 6, and 7 are leaf nodes.

In an information hierarchy, the nodes correspond to information. Typically, the piece of information associated with each node will have some form of name, and some type of content. For example, in a hierarchy that corresponds to a hierarchical file system, the nodes will typically correspond to files (where a "folder" or "directory" is one type of file). Each such file will have a name, and some form of contents.

In many situations, the names that are associated with the nodes in a hierarchy need not be unique. In the example shown in FIG. 2, both node 1 and node 7 have the name "a". Though they have the same name, they are separate and distinct nodes, which occupy different positions in the hierarchy and may be associated with completely different content.

One-Size-Fits-All

FIG. 3 is a block diagram of two tables (resource table 302 and link table 350) that may be used to represent hierarchy 200 in a relational database system. Resource table 302 includes one row for each node in the hierarchy. The row for a given node includes the name associated with the given node and the data associated with the given node. For example, row 304 corresponds to node 1, and contains the name "a" and data 306 associated with node 1. Resource table 302 is an example of a one-size-fits-all approach in that the data for all resources in the hierarchy are stored in the same structure, regardless of the data type of those resources. In the example of resource table 302, the data structure used to store the content of the resources is the single column 308. The data type for such a column could be, for example, a LOB (Large Object) type, such as a Binary LOB (BLOB) or a Character LOB (CLOB).

Link table 350 includes one row for each of the parent-child relationships in hierarchy 200. A parent column 378 holds the value that specifies the parent in a parent-child relationship, and a child column 380 holds the value that specifies the child of the parent-child relationship. For example, row 352 indicates that the root node is the parent of node 1. Similarly, rows 354 and 356 respectively indicate that node 1 is the parent of nodes 2 and 3.

Separating Hierarchical Structures from Content Structures

Tables 302 and 350 capture all the information of the hierarchy 200 in relational format. However, it may not be possible to fully utilize the power of the relational database system if the content of the resources associated with hierarchy 200 are stored using the one-size-fits-all approach represented by resource table 302. Specifically, resource table 302 includes a single column for storing the content of the resources associated the nodes in the hierarchy 200. This storage format may be sufficient when the resource associated with a node is a simple data type, such as a string or integer. However, in many situations the resources associated with the nodes in the hierarchy will be complex data types, such as complex records or XML documents. In such situations, the storage of the resource content in a single column inhibits the user's ability to run complex searches against the content. Even when the relational database system provides support for searching within a single column for values of subcomponents of complex resources, the performance of such searches is impaired.

According to one embodiment of the invention, the problems associated with storing and searching the content of complex resources that belong to an information hierarchy are overcome by storing the content of the resources associated with the nodes separately from the tables that capture the hierarchy information.

Figure 4:
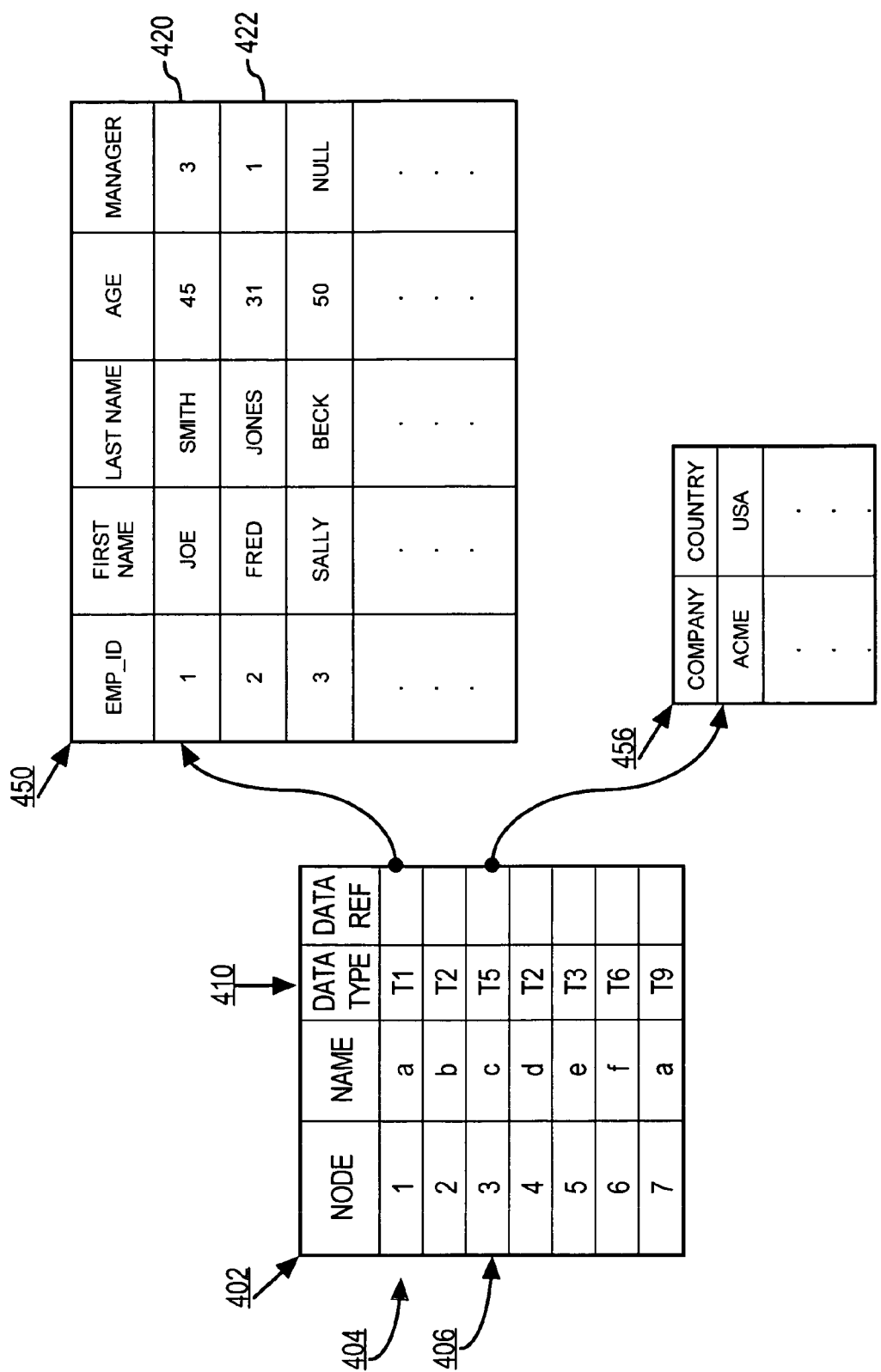
FIG. 4 is a block diagram illustrating the separation of hierarchy structures and content structures according to an embodiment of the invention.

FIG. 4, for example, shows a resource table 402 similar to resource table 302. However, resource table 402 differs from resource table 302 in that resource table 402 no longer stores that content of each resource in a column of the row for that resource. Rather, the DATA column of resource table 302 is replaced in resource table 402 with two columns DATA TYPE and DATA REF.

For each row of resource table 402, the DATA TYPE column stores data that indicates the type of resource associated with the node identified in the row. For example, row 404 corresponds to node 1 of hierarchy 200. The DATA TYPE column of row 404 indicates that the resource associated with node 1 is of type T1. Similarly, row 406 corresponds to node 3 and the DATA TYPE column of row 406 indicates that the resource associated with node 3 is of type T5.

For each row of resource table 402, the DATA REF column stores a reference to the resource associated with the node identified in the row. As used herein, the term "reference" generally refers to any data used within a database system to locate other data. For example, the DATA REF column can store pointers, or more complex information such as the "ref" data type supported by Oracle database systems. The present invention is not limited to any particular type of data for locating the resources associated with nodes in a hierarchy.

Various benefits are realized by storing the content of resources separately from the hierarchical structures that are used to capture and reflect the hierarchical relationships between the resources. For example, because the resources are stored separately from resource table 402, the content structures in which the resources are stored may be defined based on the nature of the resources. For example, the resource associated with node 1 is an employee record, and is stored in a table 450 that has columns for each of the fields of an employee record. On the other hand, the resource associated with node 3 is a company record, and is stored in a table 456 that has columns for each of the fields of a company record.

Also, because the hierarchy structures (e.g. tables 402 and 350) are separate from the content structures (e.g. tables 450 and 456), a hierarchy may be established for existing relational data with minimal effect on the storage of that data, and without requiring modification to the existing queries used to access that data. For example, the employee table 450 may have existed long before the decision to arrange information into the hierarchy 200. Also prior to that decision, many queries and views may have been defined for accessing table 450. Because tables 350 and 402 can be created without affecting the existing structure of table 450, the hierarchical structures for a hierarchy 200 that includes resources stored in table 450 may be established without the need to modify table 450 or the existing queries and views that access table 450.

According to one embodiment, resource table 402 may be implemented in a way that uses the one-size-fits-all approach for some resources, and contains references to the contents of other resources. For example, while the content of the resource associated with node 1 may be stored in table 450, the content of the resource associated with node 2 may continue to be stored in a single LOB column within table 402. The data type of a resource, as indicated in the DATA TYPE column, may be used by the database server as one factor in determining whether to store the resource content within a LOB column of the resource table 402 or in one or more separate tables.

Pre-Existing Hierarchies

Table 450 may initially exist completely independent of hierarchy structures, such as resource table 402 and link table 350. Thus, the hierarchy structures do not initially capture any information about any hierarchy to which the data in table 450 may belong. However, information stored external to such hierarchy structures may explicitly or implicitly establish a hierarchy between the rows of table 450.

In the case of table 450, such a hierarchy is implicitly established by the information contained in the EMP_ID and MANAGER columns. Specifically, the data in the EMP_ID and MANAGER columns of table 450 establish an implicit "management hierarchy" in which: the employee associated with emp_id 1 is immediately below the employee associated with emp_id 3; the employee associated with emp_id 2 is immediately below the employee associated with emp_id 1; and the employee associated with emp_id 3 has no manager (and therefore is the root node of the management hierarchy).

In the present example, the management hierarchy is a pre-existing hierarchy and the data in stored in the EMP_ID and MANAGER columns constitute an external hierarchy definition. To use the hierarchy structures to access the data in table 450 based on the management hierarchy, information about the management hierarchy must be captured in the hierarchy tables. Various techniques for capturing information about a pre-existing hierarchy shall be described in greater detail hereafter.

Capturing a Pre-Existing Hierarchy

According to one embodiment, capturing a pre-existing hierarchy involves: (1) storing in a resource table a row for each node in the pre-existing hierarchy, and (2) storing, in a hierarchy structure (such as a hierarchical index), information that captures the parent-child relationships between the nodes of the pre-existing hierarchy. Further, if the pre-existing hierarchy is being grafted into a larger hierarchy that is already reflected in the hierarchy structures, then metadata must be added to the hierarchy structures to establish the root node of the pre-existing hierarchy as a child of a node in the larger hierarchy.

Operations that perform the tasks of (1) storing in a resource table a row for each node in the pre-existing hierarchy, and (2) adding metadata that grafts the root node of the pre-existing hierarchy to a larger hierarchy are relatively straightforward. On the other hand, the technique used to capture the parent-child relationships between the nodes of the pre-existing hierarchy may vary based on the nature of the external hierarchy definition. For example, if an SQL relation defines the parent-child relationship, then the parent-child information may be captured using a SQL command that uses an appropriate connect-by clause. Alternatively, if the parent-child relationship is implicit based on hierarchically related fields, then the parent-child information may be captured using an enumeration approach. Both the connect-by and enumeration approach will be described in greater detail hereafter.

Automating Capture of Pre-Existing Hierarchies

According to one embodiment, a database server is configured to perform pre-existing hierarchy capture operations automatically in response to receiving certain information about the pre-existing hierarchy. Specifically, according to one embodiment, a database server is configured to perform a capture operation automatically in response to receiving (1) information that identifies the content structure associated with the pre-existing hierarchy, and (2) connecting criteria that indicates criteria for establishing parent-child relationships between the resources contained in the specified content structure.

For the purpose of illustration, assume that it is desirable to capture the management hierarchy associated with table 450. Under such circumstances, the automated capture operation could be performed in response to receiving (1) data that identifies table 450, and (2) data that indicates that each given row of table 450 is a child of the row whose EMP_ID is equal to MANAGER specified in the given row. Techniques that may be used to automatically capture the pre-existing hierarchy based on this information shall be described hereafter.

Capturing Parent-Child Relationships Using CONNECT BY

As mentioned above, the parent-child relationships of some pre-existing hierarchies may be indicated by an SQL relationship. For example, the management hierarchy of the records in table 450 is established by the data contained in the MANAGER column of table 450. In such cases, the parent-child relationships of the pre-existing hierarchy can be captured through the use of database commands that use an appropriate CONNECT BY clause.

For example, an automated capture operation of the management hierarchy is performed by (1) creating rows in the resource table 402 to represent nodes that correspond to the rows in table 450, and (2) generating metadata about the hierarchical relationships between those nodes by executing an SQL statement that includes a CONNECT BY clause.

Each row in the resource table 402 that represents the node for a particular row of table 450 has a reference to that particular row. For example, row 404 of resource table 402 represents the node for row 420 of table 450, and therefore includes a reference to row 420.

With respect to generating the path information associated with the pre-existing hierarchy, assume that table 450 is named 'EMP' and is defined to include the following columns: (emp_id integer, first_name varchar2(80), last_name varchar2(80), age integer, manager integer). Under these circumstances, a tree of entries (of variable depth, based on the data) can be generated using a CONNECT BY relationship such as 'START WITH manager IS NULL CONNECT BY PRIOR manager=emp_id'. In this situation, a user would typically also specify a column value to use as the name of the path element (e.g. 'first_name').

Capturing a Pre-Existing Hierarchy Using Enumeration

In some cases, a pre-existing hierarchy may be implicitly defined by fields that that have a hierarchical relationship with each other. For example, consider a relational table containing a list of products offered for sale. Such a table may, for example, be defined as follows:

```
CREATE TABLE PRODUCT_INFO
(
manufacturer VARCHAR2(128),
product_type VARCHAR2(48),
product_name VARCHAR2(80),
sku NUMBER
);
```

Such a table may be populated, for example, as illustrated by table 500 of FIG. 5. In this example, a hierarchy is implicit in the hierarchical relationship between the MANUFACTURER, PRODUCT_TYPE, PRODUCT_NAME and SKU fields. Specifically, every SKU value is one of potentially many SKU values associated with a particular PRODUCT_NAME value. Every PRODUCT_NAME value is one of potentially many PRODUCT_NAME values associated with a particular PRODUCT_TYPE value. Every PRODUCT_TYPE value is one of potentially many PRODUCT_TYPE values associated with a particular MANUFACTURER value.

Figure 6:
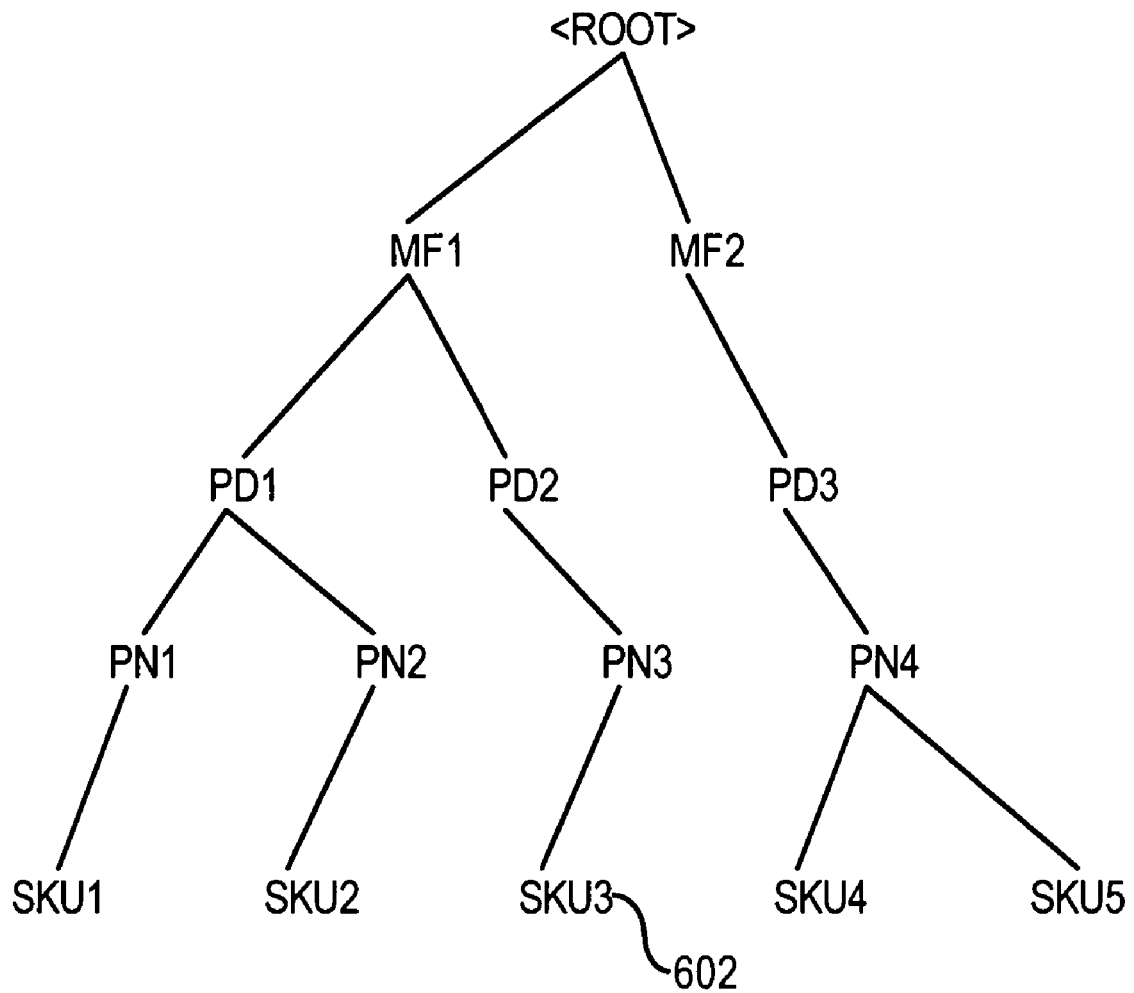
FIG. 6 is a block diagram of the hierarchy implicit in the data stored in the table of FIG. 5.

The "product category hierarchy" implicit in the values contained in table 500 is illustrated in FIG. 6. Referring to FIG. 6, each of the four hierarchically related fields of table 500 correspond to a level of hierarchy, where the MANUFACTURER field is the highest level (just below the root node), and the SKU field is the lowest level (representing the "leaf" nodes).

The enumeration approach may be used to capture the parent-child relationships when pre-existing hierarchies are defined in this manner. Specifically, the one or more columns containing the enumerated values that are involved in the hierarchy are used to generate a "collection node". Each value of each of the columns is a new "collection" at a particular depth in the hierarchy, and each column is used for a new level of the hierarchy. The last column given is treated as a file, not a collection.

Specifically, the nodes in the first level of the hierarchy may be established by performing a DISTINCT operation on the values contained in the MANUFACTURER column. The nodes in the second level of the hierarchy may be established by concatenating the MANUFACTURE and PRODUCT_TYPE values for all rows, and performing a DISTINCT operation on the resulting concatenated values. Similarly, the nodes in the third level of the hierarchy may be established by concatenating the MANUFACTURE, PRODUCT_TYPE, and PRODUCT_NAME values for all rows, and performing a DISTINCT operation on the resulting concatenated values. Finally, the leaf level of the hierarchy may be established by concatenating the MANUFACTURE, PRODUCT_TYPE, PRODUCT_NAME and SKU values for all rows, and performing a DISTINCT operation on the resulting concatenated values.

The concatenation operations described above are performed under the assumption that the names of the nodes at a given level are not constrained to be unique. For example, it assumes that a product under the PRODUCT_TYPE value PD 1can have the same name as a product under the PRODUCT_TYPE value PD2. However, if the PRODUCT_NAME column is constrained to be unique, then the nodes at the PRODUCT_NAME level of the hierarchy may be obtained by simply performing a DISTINCT operation on the values in the PRODUCT_NAME column.

It should be noted that the relative pathname of each leaf node is indicated by the values stored in the relational table row that holds the resource for that node. For example, row 502 (FIG. 5) holds the resource for node 602 (FIG. 6) and the values in the columns of row 502 correspond to the relative pathname /MF1/PD2/PN3/SKU3. Consequently, when finding the children of a particular node (such as MF1/PD2) the columns used for that node are implicitly used to select children (so the SQL used to find children of MF1/PD2 would be 'SELECT FROM PRODUCT_INFO WHERE manufacturer=MF1' and 'product_type'='PD2').

Maintaining Consistency

As mentioned above, after a pre-existing hierarchy has been captured, there exist two independent sets of data that reflect the hierarchy: the external hierarchy definition and the internal hierarchy definition. To maintain a consistent reflection of the hierarchy, the internal hierarchy definition must be modified in response to changes made to the external hierarchy definition, and the external hierarchy definition must be modified in response to changes made to the internal hierarchy definition.

For example, once captured, the management hierarchy associated with table 450 is reflected in (1) data stored in the hierarchy structures and (2) the relationship between the data in the EMP_ID column of table 450 and the data in the MANAGER column of table 450. Consequently, changes to the management hierarchy may be accomplished by either (1) changing a value in the EMP_ID or MANAGER columns of table 450 or (2) changing values in the hierarchy structures. To maintain consistency between the data in the hierarchy structures and the data in the EMP_ID and MANAGER columns, mechanisms are established to cause modifications made to one set of data to automatically cause corresponding modifications to the other set of data.

According to one embodiment, table 450 is altered such that certain checks (for example security checks) that are done as a part of the navigation of resource table 402 are done for traversing the table 450 too. Data Manipulation Language (DML) triggers are created on table 450 so that an insert, update or delete operation on the table 450 gets reflected in the data in the hierarchy structures. For example, if a row from table 450 is deleted, then a check is made to ensure that the row being deleted will not lead to any "dangling rows". For example, the node, within the management hierarchy, that is associated row 420 is the parent of the node associated with row 422. Consequently, the deletion of row 420 would sever row 422 from the management hierarchy, causing row 422 to "dangle". Because a dangling row is no longer part of the hierarchy, the deletion of row 422 would cause the deletion, from the hierarchy structures, of data relating to both row 420 and row 422.

Similarly, when a row is inserted into the table 450, the information in the hierarchy structures will be updated to add an entry for the new path that is created. Note that it is possible that when a new row is inserted, it adds a link that allows access to a subtree that was not accessible earlier. For example, assume that after row 420 was deleted, row 420 is inserted once again. By inserting row 420, row 422 is implicitly grafted back into the management hierarchy. Consequently, the insertion of row 420 causes data in the hierarchy structures to be updated to include the nodes and paths for both row 420 and row 422.

The exact operations that are performed to maintain consistency between the internal hierarchy definition and the external hierarchy definition will vary based on a variety of factors. One factor the affects what must be done to maintain consistency is the nature of the external hierarchy definition. For example, the management hierarchy that applies to table 450 is based on an SQL relation, while the product category hierarchy that applies to table 500 is based on an enumeration. When a row associated with a leaf node in the management hierarchy is deleted, typically only the row in the resource table that corresponds to that node should also be deleted. However, if a row associated with a leaf node of the product category hierarchy is deleted, then (1) the row in the resource table that corresponds to that node is deleted, and (2) it is determined whether the parent of the deleted leaf node has any remaining children. If the parent of the deleted leaf node does not have any remaining children, then the row in the resource table that corresponds to the parent node is deleted. If the row that corresponds to the parent node is deleted, then it is determined whether the parent of the parent node has any remaining children. If the parent of the parent node does not have any remaining children, then the row of the resource table associated with the parent of the parent node is also deleted. This process is repeated to remove all childless non-leaf nodes.

Similarly, for drop and truncate operations, which involve deleting all rows in the table, operations for maintaining consistency, similar to those described above for the delete operation, are performed.

In the above examples, DML triggers perform modifications on data in the hierarchy structures based on insert, update and delete operations performed on the content structures. Such DML triggers may be implemented, for example, as "INSTEAD OF" triggers. However, to ensure consistency, triggers must also be created to ensure that insert, update and delete operations on the data in the hierarchy structures result in corresponding operations on the data in the content structures.

Hardware Overview

Figure 7:
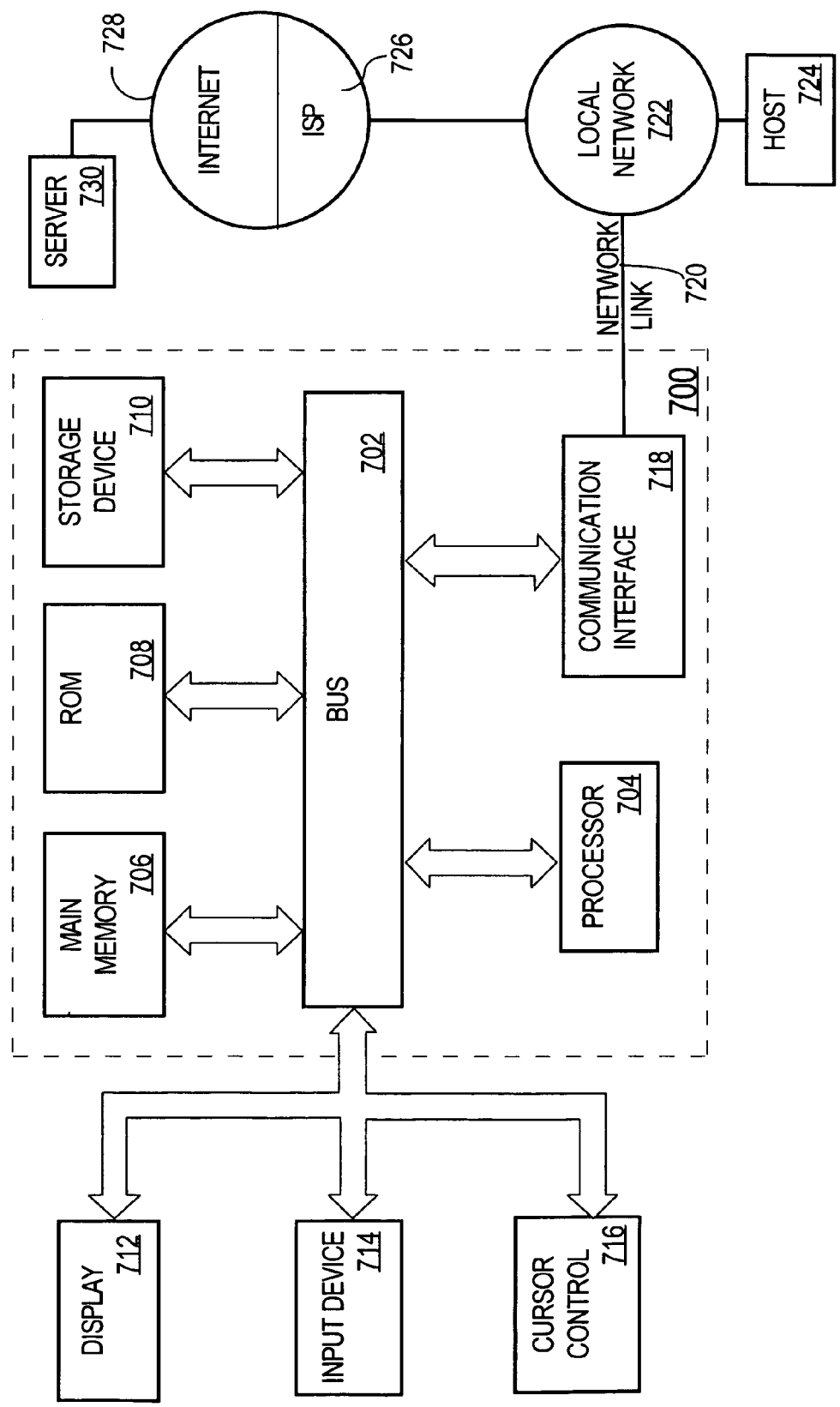
FIG. 7 is a block diagram of a system on which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing data in a database system, comprising the steps of:
   said database system maintaining
   (a) data that identifies one or more relational tables as tables that store data associated with the content of resources that belong to an information hierarchy, and
   (b) connection criteria that indicates what constitutes a hierarchical relationship in the information hierarchy;
   wherein said one or more relational tables include at least one table that stores, along with the data associated with the content of the resources, certain data that serves as an external hierarchy definition that establishes hierarchical relationships between said resources;
   said database system maintaining information that captures said information hierarchy, as an internal hierarchy definition, in one or more hierarchy structures separate from said one or more relational tables; and
   wherein the step of maintaining information that captures said information hierarchy as an internal hierarchy definition includes said database system automatically maintaining consistency between said external hierarchy definition and said internal hierarchy definition.

2. The method of claim 1, wherein the step of automatically maintaining consistency includes:
   detecting when an operation on said one or more relational tables deletes a resource associated with a leaf node in the information hierarchy; and in response to detecting said operation, automatically deleting, in a resource table, a row that corresponds to said leaf node.

3. The method of claim 2, wherein the step of automatically maintaining consistency further includes in response to detecting said operation;:
   determining whether removal of said leaf node from said information hierarchy leaves a parent node of said leaf node with no remaining child nodes; and
   if removal of said leaf node from said information hierarchy leaves a parent node of said leaf node with no remaining child nodes, then deleting, in the resource table, a row that corresponds to said parent node.

4. The method of claim 1 wherein the step of automatically maintaining consistency further includes:
   detecting when an operation on said one or more relational tables inserts a resource associated with a node in the information hierarchy; and
   in response to detecting said operation, automatically inserting, in a resource table, a row that corresponds to said node.

5. The method of claim 4, wherein the step of automatically maintaining consistency further includes in response to detecting said operation,
   determining whether addition of said node from said information hierarchy causes the addition of one or more child nodes of said node to said information hierarchy; and
   if addition of said node from said information hierarchy causes the addition of one or more child nodes of said node to said information hierarchy, then inserting, in the resource table, rows that correspond to said one or more child nodes.

6. The method of claim 1 wherein the step of maintaining information that captures said information hierarchy includes maintaining, within a resource table, a row for each node in said information hierarchy.

7. The method of claim 1, wherein the step of maintaining information that captures said information hierarchy includes maintaining, in the one or more hierarchy structures, information that indicates parent-child relationships between said resources.

8. The method of claim 1 wherein:
   the resources in the information hierarchy correspond to rows of a relational table;

and parent-child relationships between the resources are indicated by values stored in two or more columns of the relational table.

9. The method of claim 1 wherein automatically maintaining consistency includes, in response to changes made to data that constitutes the external hierarchy definition, invoking triggers to update the data that constitutes said internal hierarchy definition.

10. The method of claim 1 wherein automatically maintaining consistency includes, in response to changes made to data that constitutes the internal hierarchy definition, invoking triggers to update the data that constitutes said external hierarchy definition.

11. A computer-readable medium carrying one or more sequences of instructions for managing data in database system, wherein execution of the one or more sequences of instructions by one or more processors causes the one or more processors to perform the steps of:

said database system maintaining
(a) data that identifies one or more relational tables as tables that store data associated with the content of resources that belong to an information hierarchy, and
(b) connection criteria that indicates what constitutes a hierarchical relationship in the information hierarchy;

wherein said one or more relational tables include at least one table that stores, along with the data associated with the content of the resources, certain data that serves as an external hierarchy definition that establishes hierarchical relationships between said resources;

said database system maintaining information that captures said information hierarchy, as an internal hierarchy definition, in one or more hierarchy structures separate from said one or more relational tables; and wherein the step of maintaining information that captures said information hierarchy as an internal hierarchy definition includes said database system automatically maintaining consistency between said external hierarchy definition and said internal hierarchy definition.

12. The computer-readable medium of claim 11, wherein the step of automatically maintaining consistency includes:
detecting when an operation on said one or more relational tables deletes a resource associated with a leaf node in the information hierarchy; and in response to detecting said operation, automatically deleting, in a resource table, a row that corresponds to said leaf node.

13. The computer-readable medium of claim 12, wherein the step of automatically maintaining consistency further includes in response to detecting said operation:
determining whether removal of said leaf node from said information hierarchy leaves a parent node of said leaf node with no remaining child nodes; and if removal of said leaf node from said information hierarchy leaves a parent node of said leaf node with no remaining child nodes, then deleting, in the resource table, a row that corresponds to said parent node.

14. The computer-readable medium of claim 11 wherein the step of automatically maintaining consistency further includes in response to detecting said operation, detecting when an operation on said one or more relational tables inserts a resource associated with a node in the information hierarchy; and
in response to detecting said operation, automatically inserting, in a resource table, a row that corresponds to said node.

15. The computer-readable medium of claim 14, wherein the step of automatically maintaining consistency further includes in response to detecting said operation,
determining whether addition of said node from said information hierarchy causes the addition of one or more child nodes of said node to said information hierarchy; and
if addition of said node from said information hierarchy causes the addition of one or more child nodes of said node to said information hierarchy, then inserting, in the resource table, rows that correspond to said one or more child nodes.

16. The computer-readable medium of claim 11 wherein the step of maintaining information that captures said information hierarchy includes maintaining, within a resource table, a row for each node in said information hierarchy.

17. The computer-readable medium of claim 11, wherein the step of maintaining information that captures said information hierarchy includes maintaining, in the one or more hierarchy structures, information that indicates parent-child relationships between said resources.

18. The computer-readable medium of claim 11 wherein:
the resources in the information hierarchy correspond to rows of a relational table;
and parent-child relationships between the resources are indicated by values stored in two or more columns of the relational table.

19. The computer-readable medium of claim 11 wherein automatically maintaining consistency includes, in response to changes made to data that constitutes the external hierarchy definition, invoking triggers to update the data that constitutes said internal hierarchy definition.

20. The computer-readable medium of claim 11 wherein automatically maintaining consistency includes, in response to changes made to data that constitutes the internal hierarchy definition, invoking triggers to update the data that constitutes said external hierarchy definition.

* * * * *

UNITED STATES PATENT AND TRADEMARK OFFICE
CERTIFICATE OF CORRECTION

PATENT NO. : 7,158,981 B2  
APPLICATION NO. : 11/315835  
DATED : January 2, 2007  
INVENTOR(S) : Nipun Agarwal It is certified that error appears in the above-identified patent and that said Letters Patent is hereby corrected as shown below:

COLUMN 14

Claim 3: Line 28, delete "operation;:" and insert --operation:--.

Signed and Sealed this

Tenth Day of April, 2007

JON W. DUDAS  
*Director of the United States Patent and Trademark Office*